United States Patent
Tan et al.

(10) Patent No.: US 10,937,150 B2
(45) Date of Patent: Mar. 2, 2021

(54) SYSTEMS AND METHODS OF FEATURE CORRESPONDENCE ANALYSIS

(71) Applicant: General Electric Company, Schenectady, NY (US)

(72) Inventors: Huan Tan, Clifton Park, NY (US); Arpit Jain, Niskayuna, NY (US); Gyeong Woo Cheon, Niskayuna, NY (US); Ghulam Ali Baloch, Albany, NY (US); Jilin Tu, Santa Clara, CA (US); Weina Ge, San Ramon, CA (US); Li Zhang, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 232 days.

(21) Appl. No.: 16/022,074

(22) Filed: Jun. 28, 2018

(65) Prior Publication Data

US 2020/0005444 A1    Jan. 2, 2020

(51) Int. Cl.
*G06T 7/00* (2017.01)
*G06T 7/73* (2017.01)
(Continued)

(52) U.S. Cl.
CPC ............ *G06T 7/001* (2013.01); *G06K 9/4609* (2013.01); *G06K 9/6201* (2013.01);
(Continued)

(58) Field of Classification Search
CPC .............. G06T 7/001; G06T 7/74; G06T 7/75
See application file for complete search history.

(56) References Cited

U.S. PATENT DOCUMENTS 9,424,461 B1 * 8/2016 Yuan ................... G06K 9/00201
9,649,764 B1    5/2017 Sun et al.
(Continued)

FOREIGN PATENT DOCUMENTS

CN            101071111 B      5/2011

OTHER PUBLICATIONS

Denzler et al., "Learning, Tracking and Recognition of 3D Objects", Proceedings of the IEEE/RSJ/GI International Conference on Intelligent Robots and Systems '94. 'Advanced Robotic Systems and the Real World, pp. 0-9, Sep. 12-16, 1994, 9 pp.
(Continued)

*Primary Examiner* — Wen W Huang
(74) *Attorney, Agent, or Firm* — Fletcher Yoder, P.C.

(57) ABSTRACT

A method and system, the method including receiving semantic descriptions of features of an asset extracted from a first set of images; receiving a model of the asset, the model constructed based on a second set of a plurality images of the asset; receiving, based on an optical flow-based motion estimation, an indication of a motion for the features in the first set of images; determining a set of candidate regions of interest for the asset; determining a region of interest in the first set of images; iteratively determining a matching of features in the set of candidate regions of interest and the determined region of interest in the first set of images to generate a record of matches in features between two images in the first set of images; and displaying a visualization of the matches in features between two images in the first set of images.

19 Claims, 5 Drawing Sheets

(51) Int. Cl.
  *G06K 9/62* (2006.01)
  *G06T 7/20* (2017.01)
  *G06K 9/46* (2006.01)

(52) U.S. Cl.
  CPC .............. *G06K 9/6256* (2013.01); *G06T 7/20* (2013.01); *G06T 7/74* (2017.01); *G06T 7/75* (2017.01); *G06T 2207/30108* (2013.01)

(56) References Cited

U.S. PATENT DOCUMENTS

| | | | |
|---|---|---|---|
| 2003/0007682 A1 | 1/2003 | Koshizen et al. | |
| 2004/0095374 A1 | 5/2004 | Jojic et al. | |
| 2004/0258309 A1* | 12/2004 | Keaton | G06K 9/6255 382/190 |
| 2006/0221072 A1* | 10/2006 | Se | G06T 7/593 345/420 |
| 2008/0298672 A1* | 12/2008 | Wallack | G06K 9/32 382/154 |
| 2010/0195872 A1 | 8/2010 | Velardo et al. | |
| 2010/0305857 A1 | 12/2010 | Byrne et al. | |
| 2012/0293667 A1* | 11/2012 | Baba | H04N 7/00 348/187 |
| 2012/0314935 A1* | 12/2012 | Cheng | G06K 9/00671 382/154 |
| 2014/0169624 A1* | 6/2014 | Jung | G06K 9/00369 382/103 |
| 2016/0314585 A1* | 10/2016 | Thomas | G06K 9/00362 |
| 2017/0031034 A1 | 2/2017 | Joung et al. | |
| 2017/0140242 A1* | 5/2017 | Saklatvala | G06K 9/6201 |
| 2017/0228878 A1* | 8/2017 | Goldman | G06T 7/75 |
| 2018/0130234 A1* | 5/2018 | Barker | G06T 7/0006 |
| 2018/0165305 A1* | 6/2018 | Wang | G06N 3/086 |
| 2018/0211373 A1* | 7/2018 | Stoppa | G06K 9/6273 |
| 2019/0026922 A1* | 1/2019 | Kellogg | G06K 9/00208 |

OTHER PUBLICATIONS

Gururanjan et al., "Statistical Approach to Unsupervised Defect Detection and Multiscale Localization in Two-Texture Images", Optical Engineering, vol. 47, Issue 2, Feb. 1, 2008, 10 pp.

Cannarile et al., "A Fuzzy Expectation Maximization based Method for Estimating the Parameters of a Multi-State Degradation Model from Imprecise Maintenance Outcomes", Annals of Nuclear Energy, pp. 1-37, Jul. 2017, 37 pp.

* cited by examiner

SYSTEMS AND METHODS OF FEATURE CORRESPONDENCE ANALYSIS

BACKGROUND

The present disclosure relates, generally, to computer vision and, more specifically, to extracting and tracking features in an environment in an inspection process.

Robotic inspection systems and processes using computer vision techniques may be used to identify, examine, and track an item or asset in some instances. In many instances however, at least some aspects of the robotic inspection system or process may be plagued with issues that lead to inaccuracies in the identifying and tracking of a subject asset. In some instances, issues relate to the capture and representation of a subject asset. In some instances, the system or method may initially operate within acceptable tolerances, but degrade over time. In other systems and processes, execution may be too slow to be practicable in many situations, especially situations where the tracking information is needed in (near) real-time.

Therefore, a system and a method that will address the foregoing issues is desirable that can efficiently determine and track features of an industrial asset in the asset's natural environment, thereby at least providing a reliable preliminary inspection process and system.

DESCRIPTION OF THE DRAWINGS

These and other features and aspects of embodiments of the present disclosure will become better understood when the following detailed description is read with reference to the accompanying drawings, in which like characters represent like parts throughout the drawings, wherein.

DETAILED DESCRIPTION

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
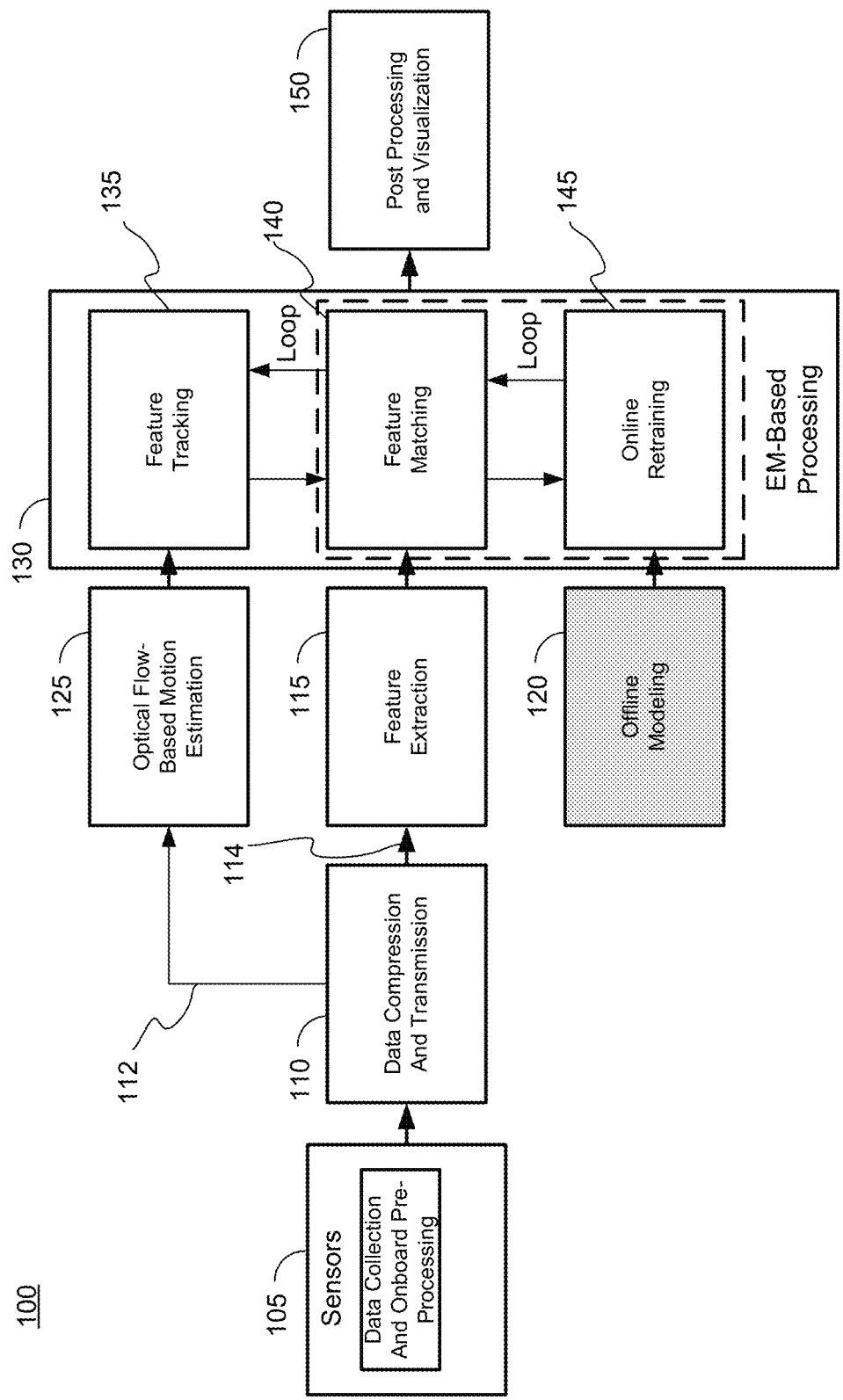
FIG. 1 is an illustrative example of a schematic block diagram of a system, according to some embodiments.

FIG. 1 is an illustrative example of a schematic block diagram of a system 100 for a machine such as, for example, an autonomous or semi-autonomous robot, to match, track, and analyze features of an industrial asset in different environments, according to some embodiments. In some embodiments, one function of the machine may be to provide, on-site, real-time inspection results. In some instances, the inspection results generated by the machine may include preliminary inspection results that might be further analyzed and processed, alone or in combination with other data, to generate, for example, other further-developed inspection results.

System 100 may be implemented by a machine having a memory and processor, where the processor can execute program instructions stored in the memory to complete one or more tasks. Additionally, the machine may have a number of sensors 105 associated therewith, and the sensors might be integrated into the machine or otherwise interfaced with the machine via a communication channel. The sensors 105 collect sensory data. In an example of FIG. 1, sensors 105 capture or sense data in the environment and may include RGB (red, green, blue color model) cameras, laser sensors, sonars, infrared cameras, RGB-Depth cameras, and other imaging technologies to capture images (i.e., data) of an asset in the environment. To perform the inspection tasks of the machine embodying system 100, sensors 105 comprise environmental information-related sensors intended to extract features of an asset. In some embodiments, sensors 105 may perform at least some pre-processing of the images captured by the sensors using the resources of the sensors. In some instances, the pre-processing of the image data might facilitate a transmission to and/or processing of the data by a device, system, or service.

The image data captured by the sensors 105 is transmitted at 110 to a processing system, device, or service that can perform the further processing functions depicted in FIG. 1. In some embodiments, the imaged data is compressed prior to the transmission, according to known and future developed compression (encrypted or unencrypted) techniques achieving different compression ratios. The captured image data may be transmitted to the device, system, or service using any wired or wireless communication protocol, now known or developed in the future. In some aspects, the device, system, and service to which the captured image data is transmitted to might include a local workstation, (e.g., a laptop, a desktop computer, a handheld computing device, etc.). In some embodiments, a server may be used to broadcast the captured image data to multiple devices instantiating consumers subscribing to the image data.

In general, the local workstation receives the captured image data and processes it through two channels, 112 and 114. The image data on channel 114 is processed to extract features from the images by feature extraction module 115. Feature module 115 operates to extract features from the images and categorize them into multiple different levels based on a semantics description level. In some embodiments, the different levels of categorization may include three levels—a low level, a middle level, and a high level. The low level description may include descriptions of basic computer vision features, such as, for example, corners, lines, planes, cubes, etc. The middle level description may include descriptions of recognized objects, where objects comprise a group of features associated with a geometrical primitive(s) in the environment. The high level description may include semantic descriptions of objects and their affordances, where the geometrical relationship and affordance relationship among the objects are included in this high level description. In some embodiments, more, fewer, or alternative levels of description may be used in categorizing the extracted features.

In some aspects, different computer vision technologies may be used to detect and describe the features in the images, including corners, lines, planes, etc. In some instances, parallel computing and other processing techniques might be leveraged to detect features in different patches or predefined regions in the images.

In some embodiments, the semantic descriptions of the objects may be generated using human annotation and an analysis of analogy between unknown objects and newly added objects. The affordance of each object might be trained using manipulation tasks. In some instances, the semantic description of objects may include the pose of the object in the environment. In some embodiments, the overall geometrical relationship among the objects may be represented as a graph.

The features extracted by feature extraction module 115 may be used by a feature matching module 140. In some aspects, objects (i.e., considered as groups of features) may be determined or recognized using different techniques or algorithms to recognize objects in the images. In one aspect, a rather straight-forward technique to recognize objects may be used to determine objects based on one-to-one feature matching between images. Another technique might determine objects based on classifiers trained by learning model(s).

A feature matching module 140 may find the correspondence of features between different frames of images of the captured image data. A number of different feature matching techniques and algorithms may be used in some embodiments herein, such as, for example, FLANN (i.e., Fast Library for Approximate Nearest Neighbor), KNN (i.e., K Nearest Neighbor), and other feature matching algorithms.

In some aspects, simple corner-based features are not sufficiently robust for recognizing objects in images. For example, lighting conditions when capturing images can greatly affect the performance of detecting and describing features in the captured images. Also, the view-angle of the sensor used to capture an image can have an impact on computer vision processing of the image since data (i.e., images) captured at different view-angles can generate different descriptors of the same feature point. In some embodiments herein, a model of an asset to be tracked is not based on a single image. Instead, a model herein may be built from a group of images, where each image contains one three dimension (i.e., 3D) area of interest on an industrial asset. This 3D area is referred to herein a ROI (i.e., region of interest) and is the area that we want to track and match the feature(s) therein. In some aspects, in order to address and overcome the challenge of having different descriptors at different view-angles for the same ROI, images will be intentionally taken at different view-angles to train a model to describe a 3D ROI area. Notably, the model will be trained describing a 3D area, rather than a 2D (i.e., three dimension) area on captured images.

Figure 2:
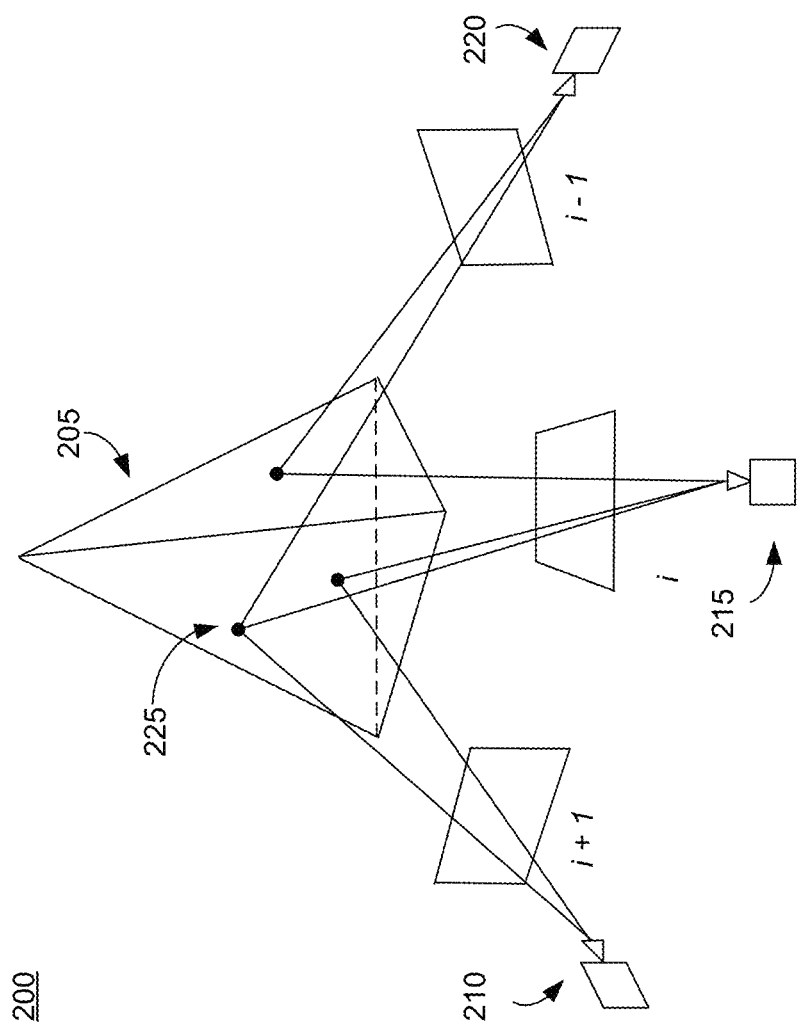
FIG. 2 is an illustrative depiction of a system for collecting image data, according to some embodiments.

FIG. 2 is an illustrative example system 200, according to some embodiments herein. System 200 includes a plurality of sensors (e.g., cameras) 210, 215, and 220 positioned at different locations i−1, i, and i+1 respectively, relative to an object (e.g., industrial asset) 205. Each of the sensors operate to capture object 205, including a specific ROI thereto. In the example of FIG. 2, the ROI includes the object point 225. As shown, sensors 210, 215, and 220 capture images of the same ROI, but from different view-angles. The images captured by sensors 210, 215, and 220 may be used to train a model of the asset 205, in accordance with other aspects herein. In some embodiments, one (or more) sensor(s) may be moved to different locations and the sensed signals from the different locations can be analyzed as a group.

Referring to FIG. 1, a model of an asset may be built based on a volume of industrial knowledge (e.g., large datasets (i.e., big data) amassed by an industrial entity and/or a combination of data sources, including a group or set of images of an image at different view-angles. In some aspects, the model to extract objects from captured image data, may be constructed using a deep learning neural network. The past industrial knowledge of the asset may be used to train the deep learning neural network model to extract the desired 3D features from images of the asset during an offline modeling phase at 120, where the model describes a ROI on the asset. In this regard, the greater the knowledge used to train the model, then the greater the accuracy of the model may be in extracting features from images.

In some aspects, the model may be continuously updated by the acquisition of new (i.e., current) images of particular instance(s) of an asset by an online retraining module at 145. The retraining at 145 may be referred to as being online since the updated, current images may be acquired and used to further train the model when system 100, including an E-M module 130, is online during a runtime execution of some of the processes disclosed herein. In some aspects, the model may be continuously updated by online retraining module 145.

In some aspects, online retraining module 145 and feature matching module 140 may comprise an iterative loop, wherein features extracted by online retraining module 145 using the model retrained based on captured images may be provided to feature matching module 140 for use in matching match features in incoming image data. Also, indications of matched features from feature matching module 140 may be used in further training the model by online retraining module 145. This iterative process involving retraining module 145 and feature matching module 140 may continue for a minimum number of times, until a threshold level of confidence is reached as determined by system 100, other criteria, and combinations thereof.

A feature matching module 140 herein may find the correspondence of features between different frames of images of the captured image data. A number of different feature matching techniques and algorithms may be used in some embodiments herein, such as, for example, FLANN (i.e., Fast Library for Approximate Nearest Neighbor), KNN (i.e., K Nearest Neighbor), and other feature matching algorithms.

Referring to FIG. 1 and data compression and transmission module 110, transmission channel 112 supplies the captured image data to an optical flow-based motion estimation module 125. Optical flow-based motion estimation module 125 operates to approximate local motion in images based on local derivatives in a sequence of the captured images. In some embodiments, optical flow-based motion estimation module 125 specifies how much each image pixel moves between adjacent (i.e., time-wise consecutive) images and based on the "optical flow" between the two images and feature tracking module 135 further determines the potential motion of features in the images. In some embodiments given a region in a first image, feature tracking module 135 may use the image motion determined by optical flow-based motion estimation module 125 and an affine transformation process to determine a region of interest in a second image. In some aspects, the combination of optical flow-based motion estimation module 125 and feature tracking module 135 herein, may operate to limit some issues of false positives associated with prior feature matching processes.

In some aspects, feature matching module 140 and feature tracking module 135 may operate to provide feature matching and feature tracking of features extracted from captured images. Significant improvements may be achieved by the present disclosure of using the results from online retraining module 145 and feature tracking module 135 in an iterative Extraction-Maximization (EM) based process herein. The EM process may be performed by EM module 130.

Figure 3:
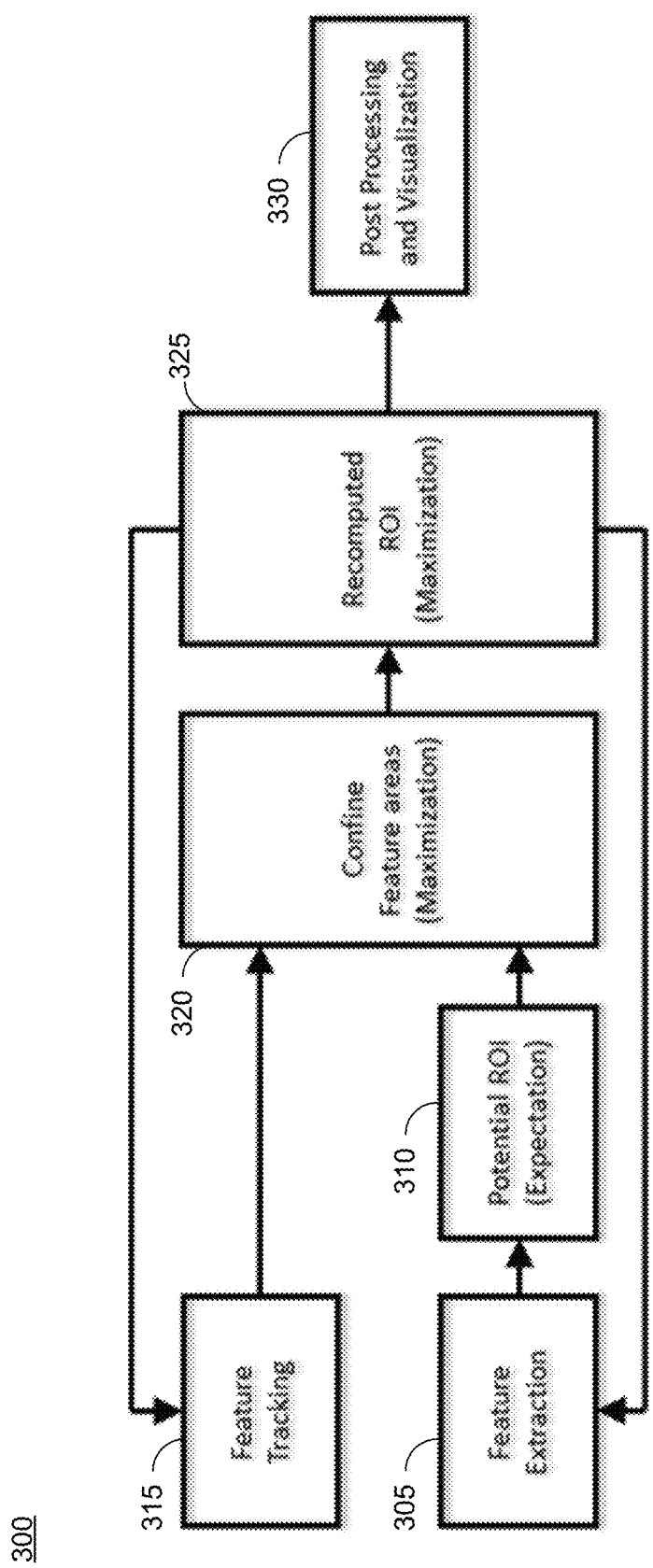
FIG. 3 is an illustrative example of an Expectation-Maximization (EM) process schematic block diagram of a system, according to some embodiments.

An EM process in accordance with some embodiments herein is illustrated in FIG. 3. Iterative EM process 300 herein may be beneficial in some use-cases and applications since, in many instances, features might not be found quickly in images and/or if found, the found features might only include a portion of the features of an original template image. In some instances, the "matched" features might have numerous false positive matches (i.e., mismatches).

In some embodiments, if a sufficient number (e.g., minimum threshold value) of features or features to be matched cannot be determined by a feature matching process (e.g., FIG. 1, 140), then a result from the online retraining module (e.g., FIG. 1, 145) is used to generate several potential, candidate ROIs. This aspect herein is referred to as an expectation(E) step 310. Expectation(E) step 310 operates to attempt to find all of the potential candidate areas based on the prior limited knowledge. The potential candidate areas reflect the probability over a distribution model. In some aspects, each potential candidate area may have different probability of observation based on their association with this model.

The result from feature tracking module (e.g., FIG. 1, 135) at 315 is a bounding box representative of the ROIs on an image. As previously introduced, it is generated by an optical flow-based motion estimation process. Without adaption in some embodiments, the bounding box will always have the same size. While determining the ROIs by the feature tracking module at 315 may be robust, it is not well-suited to accurately finding or determining the features in ROIs.

Using the potential candidate areas from online retraining module as determined at 310 and the bounding box determined for an image by feature tracking module at 315, a maximization(M) step 320 herein operates to determine the most confident area and features that are a match to the image template.

In some embodiments, a machine herein extracts features from the ROI on the image template and a ROI on the real-time capture image the expectation(E) step 310. This process yields exactly matched features or mismatched features. In an effort to avoid too much false information, only features with higher robustness scores and matching scores may be selected as matched features. Then, a resulting bounding box from the feature tracking module at 315 will be used to confine the matched features in the bounding box, which corresponds to the most confident features, in a maximization(M) step 320. Moreover, features identified as being far away from the bounding box can be discarded and a recommended ROI can be generated at 325.

As an iterative process, the feature matching may be conducted again with the ROI between the image template and the real-time capture image at 310. This time however, the criterions for selecting the features may be reduced or less strict. The threshold or bar for a robustness score and matching score may be reduced in an effort to have more features selected. The matched result from 325 may be used to update the size and position of the ROIs generated by feature tracking at 315. Then, the bounding box from feature tracking at 315 will be used again to refine the results at 320 and generate recommended ROIs at 325. Process 300 may be repeated a number of times to generate a good estimation of the ROI and the features included, that are well matched. In some aspects, EM process 300 may comprise a first iterative loop including online modeling 145 and feature matching 140 and a second iterative loop including feature tracking 135 and feature matching 140, where the combination of the two iterative loops is encompassed in the EM process herein.

In some aspects, a postprocessing and visualization operation is further included in system 100 of FIG. 1 and process 300 of FIG. 3. Post processing and visualization aspects may include displaying the features extracted from the ROIs of the processed images on each image on display device, as well as displaying the matching features between two images. In some instances, the two images displayed with the determined ROIs and matching features are time-wise consecutive images of an asset. Matches between features on two images may be visualized by lines between features on a first image (e.g., template image) and a second image (e.g., a real-time captured image). A bounding box visualization on displayed images may be presented around matched features to demonstrate the ROIs and the features therein.

Figure 4:
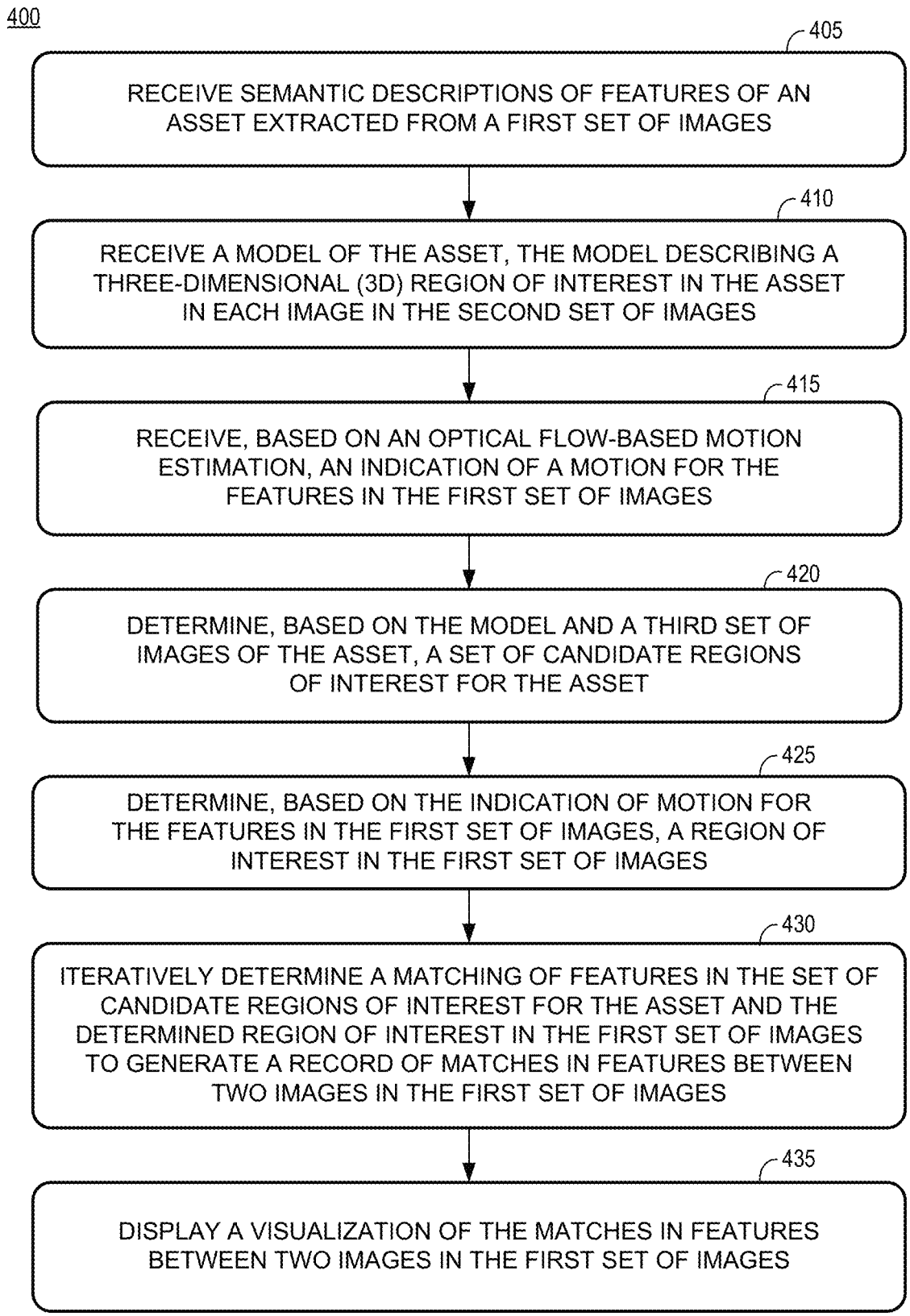
FIG. 4 is an illustrative flow diagram of a process, according to some embodiments.

FIG. 4 is an illustrative flow diagram of a process 400, in accordance with some embodiments herein. Process may be similar in some aspects to some of the features and embodiments disclosed in the discussion of system 100 and process 300. Accordingly, process may be fully understood in combination with the discussion of system 100 and process 300, and similar aspects may not be repeated detail.

At operation 405, a system, device, or service receives semantic descriptions of features of an asset, where the features are extracted from a first set of images. As with some other embodiments herein, the first set of images may include images of the asset captured from multiple different view-angles.

At operation 410, a model of the asset is received, where the model describes a 3D region of interest on the asset and is built based on a second set of images. The second set of images may be part of a knowledge base associated with the asset being modeled.

At operation 415, an indication of a motion of the features in the first set of images is received. As discussed earlier, the motion of the features in the images may be determined using an optical flow-based motion estimation process.

At operation 420, a determination is performed based on a third set of images of the asset and the model. The third set of images may include updated or current images of a subject asset and can be used to update the model. The updated model is used at 420 to determine a set of candidate ROIs for the first set of images.

At operation 425, a determination is performed to determine, based on the indication of motion for the features in the first set of images, a region of interest in the first set of images.

At operation 430, an iterative process is performed (e.g., process 300) to determine a matching of features in the set of candidate regions of interest for the asset and the determined region of interest in the first set of images to generate a record of matches in features between two images in the first set of images, where the two images are typically consecutive images in a sequence of images.

Process 400 may conclude at operation 435 that includes post processing and visualizations of the results included in the generated record of operation 430. In some aspects, the visualizations of operation 435 might include, for example, a graphical display of the matches in features between two images in the first set of images.

Figure 5:
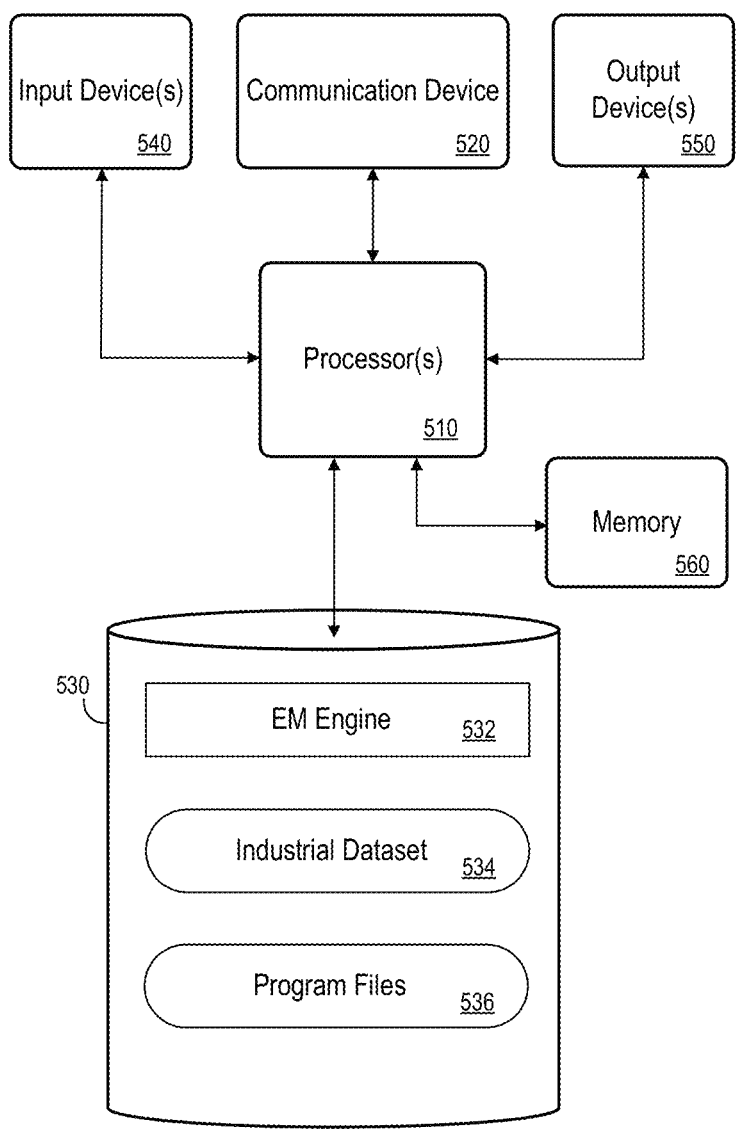
FIG. 5 is a block diagram of an apparatus, according to some embodiments.

FIG. 5 is a block diagram of computing system 500 according to some embodiments. System 500 may comprise a general-purpose or special-purpose computing apparatus and may execute program code to perform any of the methods, operations, and functions described herein. System 500 may comprise an implementation of one or more systems (e.g., system 100) and processes (e.g., 300). System 500 may include other elements that are not shown, according to some embodiments.

System 500 includes processor(s) 510 operatively coupled to communication device 520, data storage device 530, one or more input devices 540, one or more output devices 550, and memory 560. Communication device 520 may facilitate communication with external devices, such as a data server and other data sources. Input device(s) 540 may comprise, for example, a keyboard, a keypad, a mouse or other pointing device, a microphone, knob or a switch, an infra-red (IR) port, a docking station, and/or a touch screen. Input device(s) 540 may be used, for example, to enter information into system 500. Output device(s) 550 may comprise, for example, a display (e.g., a display screen) a speaker, and/or a printer.

Data storage device 530 may comprise any appropriate persistent storage device, including combinations of magnetic storage devices (e.g., magnetic tape, hard disk drives and flash memory), optical storage devices, Read Only Memory (ROM) devices, etc., while memory 560 may comprise Random Access Memory (RAM), Storage Class Memory (SCM) or any other fast-access memory.

EM engine 532 may comprise program code executed by processor(s) 510 (and within the execution engine) to cause system 500 to perform any one or more of the processes described herein. Embodiments are not limited to execution by a single apparatus. Industrial data 534 may comprise a knowledge base associated with one or more subject industrial assets, according to some embodiments. Data storage device 530 may also store data and other program code 536 for providing additional functionality and/or which are necessary for operation of system 500, such as device drivers, operating system files, etc.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

This written description uses examples to explain the disclosure, including the best mode, and also to enable any person skilled in the art to practice the disclosure, including making and using any devices or systems and performing any incorporated methods. The patentable scope of the disclosure is defined by the claims appended hereto, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system, comprising:
    a memory storing executable program instructions therein; and
    a processor in communication with the memory, the processor operative to execute the program instructions to:
        receive semantic descriptions of features of an industrial asset, wherein the features are extracted from a first set of images of the industrial asset;
        generate a model of the industrial asset, wherein the model is constructed based on a second set of images of the industrial asset and describes a three-dimensional (3D) region of interest in the industrial asset in each image in the second set of images;
        receive, based on an optical flow-based motion estimation, an indication of motion for the features in the first set of images of the industrial asset;
        determine, based on the model and a third set of images of the industrial asset, a set of candidate regions of interest in the first set of images;
        determine, based on the indication of motion for the features in the first set of images, a region of interest in the first set of images;
        iteratively determine a matching of features in the set of candidate regions of interest in the first set of images and the region of interest in the first set of images to generate a record of matches in features between two images in the first set of images; and
        display a visualization of the matches in features between the two images in the first set of images.

2. The system of claim 1, wherein images included in the second set of images used to construct the model are captured from a plurality of different view-angles.

3. The system of claim 1, wherein the semantic descriptions of the features of the industrial asset comprise multiple levels of description including a low level description that describes basic primitive features, a middle level description that describes objects as a group of features, and a high level description that describes the objects and affordances of the objects.

4. The system of claim 1, wherein the semantic descriptions of the features of the industrial asset are determined by a deep learning neural network.

5. The system of claim 1, wherein the third set of images of the industrial asset are obtained during a runtime execution of the system and include a stream of updated images of the industrial asset that are used to update the model.

6. The system of claim 1, wherein the record of the matches in features between the two images in the first set of images includes two time-wise consecutive images.

7. The system of claim 1, wherein the semantic descriptions of the features of the industrial asset comprise affordances of the features.

8. A computer-implemented method, comprising:
    receiving semantic descriptions of features of an industrial asset, wherein the features are extracted from a first set of images of the industrial asset;
    generating a model of the industrial asset, wherein the model is constructed based on a second set of images of the industrial asset and describes a three-dimensional (3D) region of interest in the industrial asset in each image in the second set of images;
    receiving, based on an optical flow-based motion estimation, an indication of motion for the features in the first set of images of the industrial asset;
    determining, based on the model and a third set of images of the industrial asset, a set of candidate regions of interest in the first set of images;
    determining, based on the indication of motion for the features in the first set of images, a region of interest in the first set of images;
    iteratively determining a matching of features in the set of candidate regions of interest in the first set of images and the region of interest in the first set of images to generate a record of matches in features between two images in the first set of images; and displaying a visualization of the matches in features between the two images in the first set of images.

9. The computer-implemented method of claim 8, wherein images included in the second set of images used to construct the model are captured from a plurality of different view-angles.

10. The computer-implemented method of claim 8, wherein the semantic descriptions of the features of the industrial asset comprise multiple levels of description including a low level description that describes basic primitive features, a middle level description that describes objects as a group of features, and a high level description that describes the objects and affordances of the objects.

11. The computer-implemented method of claim 8, wherein the semantic descriptions of the features of the industrial asset are determined by a deep learning neural network.

12. The computer-implemented method of claim 8, wherein the third set of images of the industrial asset are obtained during a runtime execution and include a stream of updated images of the industrial asset that are used to update the model.

13. The computer-implemented method of claim 8, wherein the record of the matches in features between the two images in the first set of images includes two time-wise consecutive images.

14. A non-transitory computer readable medium having executable instructions stored therein, the non-transitory computer readable medium comprising:

instructions to receive semantic descriptions of features of an industrial asset, wherein the features are extracted from a first set of images of the industrial asset;

instructions to generate a model of the industrial asset, wherein the model is constructed based on a second set of images of the industrial asset and describes a three-dimensional (3D) region of interest in the industrial asset in each image in the second set of images;

instructions to receive, based on an optical flow-based motion estimation, an indication of motion for the features in the first set of images of the industrial asset;

instructions to determine, based on the model and a third set of images of the industrial asset, a set of candidate regions of interest in the first set of images;

instructions to determine, based on the indication of motion for the features in the first set of images, a region of interest in the first set of images;

instructions to iteratively determine a matching of features in the set of candidate regions of interest in the first set of images and the region of interest in the first set of images to generate a record of matches in features between two images in the first set of images; and instructions to display a visualization of the matches in features between the two images in the first set of images.

15. The non-transitory computer readable medium of claim 14, wherein images included in the second set of images used to construct the model are captured from a plurality of different view-angles.

16. The non-transitory computer readable medium of claim 14, wherein the semantic descriptions of the features of the industrial comprise multiple levels of description including at least a low level description that describes basic primitive features, a middle level description that describes objects as a group of features, and a high level description that describes the objects and affordances of the objects.

17. The non-transitory computer readable medium of claim 14, wherein the semantic descriptions of the features of the industrial asset are determined by a deep learning neural network.

18. The non-transitory computer readable medium of claim 14, wherein the third set of images of the industrial asset are obtained during a runtime execution and include a stream of updated images of the industrial asset that are used to update the model.

19. The non-transitory computer readable medium of claim 14, wherein the record of the matches in features between the two images in the first set of images includes two time-wise consecutive images.

* * * * *